United States Patent

Yokokawa

(10) Patent No.: US 11,402,917 B2
(45) Date of Patent: Aug. 2, 2022

(54) GESTURE-BASED USER INTERFACE FOR AR AND VR WITH GAZE TRIGGER

(71) Applicant: Sony Interactive Entertainment Inc., Tokyo (JP)

(72) Inventor: Yutaka Yokokawa, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 557 days.

(21) Appl. No.: 16/013,682

(22) Filed: Jun. 20, 2018

(65) Prior Publication Data

US 2019/0391662 A1 Dec. 26, 2019

(51) Int. Cl.
G06F 3/01 (2006.01)
G06T 19/00 (2011.01)
A63F 13/25 (2014.01)

(52) U.S. Cl.
CPC .......... *G06F 3/017* (2013.01); *A63F 13/25* (2014.09); *G06F 3/013* (2013.01); *G06T 19/006* (2013.01); *A63F 2300/8082* (2013.01)

(58) Field of Classification Search
CPC .......... G06F 3/017; G06F 3/013; A63F 13/25; A63F 2300/8082; G06T 19/006
See application file for complete search history.

(56) References Cited

U.S. PATENT DOCUMENTS

| | | | | |
|---|---|---|---|---|
| 7,970,176 B2* | 6/2011 | Kutliroff | ................ | A63F 13/10 382/103 |
| 2009/0085864 A1* | 4/2009 | Kutliroff | ................ | A63F 13/10 345/156 |
| 2009/0217211 A1* | 8/2009 | Hildreth | ................ | G06F 3/017 715/863 |
| 2010/0285880 A1 | 11/2010 | Crocker | | |
| 2012/0054690 A1 | 3/2012 | Lim | | |
| 2013/0239041 A1 | 9/2013 | DaCosta | | |
| 2013/0283214 A1 | 10/2013 | Kim et al. | | |
| 2014/0104274 A1* | 4/2014 | Hilliges | ................ | G06F 30/20 345/424 |
| 2014/0237366 A1 | 8/2014 | Poulos et al. | | |
| 2015/0002391 A1* | 1/2015 | Chen | ................ | G06F 3/017 345/156 |
| 2015/0220776 A1* | 8/2015 | Cronholm | ................ | G06F 3/017 382/103 |

OTHER PUBLICATIONS

International Search Report and Written Opinion from the counterpart PCT application PCT/US19/35018 dated Sep. 10, 2019.

* cited by examiner

*Primary Examiner* — Afroza Chowdhury
(74) *Attorney, Agent, or Firm* — John L. Rogitz

(57) ABSTRACT

A 3D object is opened for presentation on a display in response to a trigger, such as a gaze direction detected by eye tracking in conjunction with a trigger hand gesture. A player's emulated hand in emulated space is configured to have the same gesture as the player's real hand as imaged by a camera, and only when the emulated hand is within the 3D object in emulated space are gestures of the hand correlated to input commands. Otherwise, hand gestures are not considered for correlation to commands.

20 Claims, 7 Drawing Sheets

EXAMPLE TRIGGER
GESTURE (CLOSED FIST)

EXAMPLE CLOSE
GESTURE (HAND WAVE)

US 11,402,917 B2

GESTURE-BASED USER INTERFACE FOR AR AND VR WITH GAZE TRIGGER

FIELD

The application relates generally to gesture-based user interfaces (UI) for augmented reality (AR) and virtual reality (VR), potentially with gaze triggers.

BACKGROUND

Gestures to input commands to computer programs such as computer games are convenient and intuitive to use. As understood herein, during some computer use such as virtual reality (VR) game playing, players typically move considerably, which may result in making a gesture that, while not intended to input a command, may be detected by a game processor and interpreted as a command.

SUMMARY

A device includes at least one computer memory that is not a transitory signal and that in turn includes instructions executable by at least one processor to present a three-dimensional (3D) object on at least one display, and to image a player's appendage to render an emulated appendage. The emulated appendage has a gesture configuration as established by the player's appendage. The instructions are executable to, responsive to the emulated appendage being at least partially within the 3D object, determine whether the gesture configuration correlates to a command, and responsive to the gesture configuration correlating to a command, execute the command. In contrast, the instructions are executable to, responsive to the emulated appendage not being at least partially within the 3D object, not determine whether the gesture configuration correlates to a command.

In some embodiments, the instructions are executable to present the 3D object responsive to reception of at least one trigger. The trigger may include at least one eye tracking input signal and/or at least one gesture of the appendage. An example command can include a command to present at least one menu with at least one selection.

In non-limiting implementations, the trigger is input by a first player and the emulated appendage is an emulated appendage of a second player. In some examples, the instructions are executable to conceal the gesture configuration of the emulated appendage.

In another aspect, an assembly includes at least one display and at least one processor configured to control the at least one display to present images thereon, with the processor being configured with instructions to, responsive to receiving a first eye tracking signal, present a three-dimensional (3D) object on the at least one display. The instructions are executable to receive at least one image of a player's appendage, and based at least in part on the image, render an emulated appendage having a gesture configuration as established by the player's appendage. The instructions also are executable to, responsive to the emulated appendage being at least partially within the 3D object, determine whether the gesture configuration correlates to a command, and responsive to the gesture configuration correlating to a command, execute the command. On the other hand, the instructions are executable to, responsive to the emulated appendage not being at least partially within the 3D object, not determine whether the gesture configuration correlates to a command.

In another aspect, a method includes opening a 3D object for presentation on a display in response to a trigger. The method also includes emulating a player's hand in emulated space to render an emulated hand configured to have a same gesture as the player's hand as imaged by a camera. The method includes, only when the emulated hand is within the 3D object in emulated space, correlating gestures of the emulated hand to input commands, and otherwise not considering hand gestures for correlation to commands.

The details of the present application, both as to its structure and operation, can best be understood in reference to the accompanying drawings, in which like reference numerals refer to like parts, and in which:

DETAILED DESCRIPTION

Figure 1:
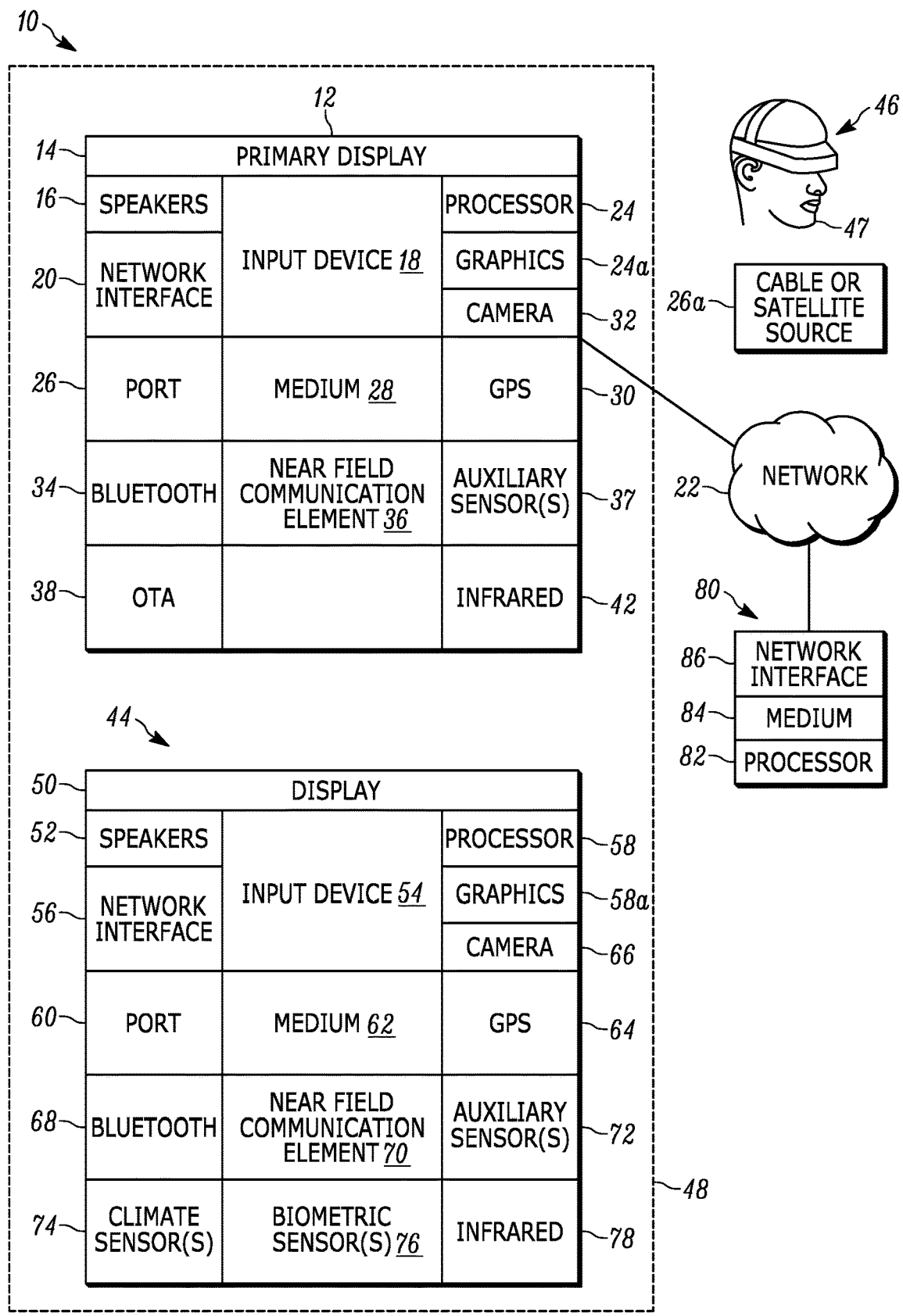
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
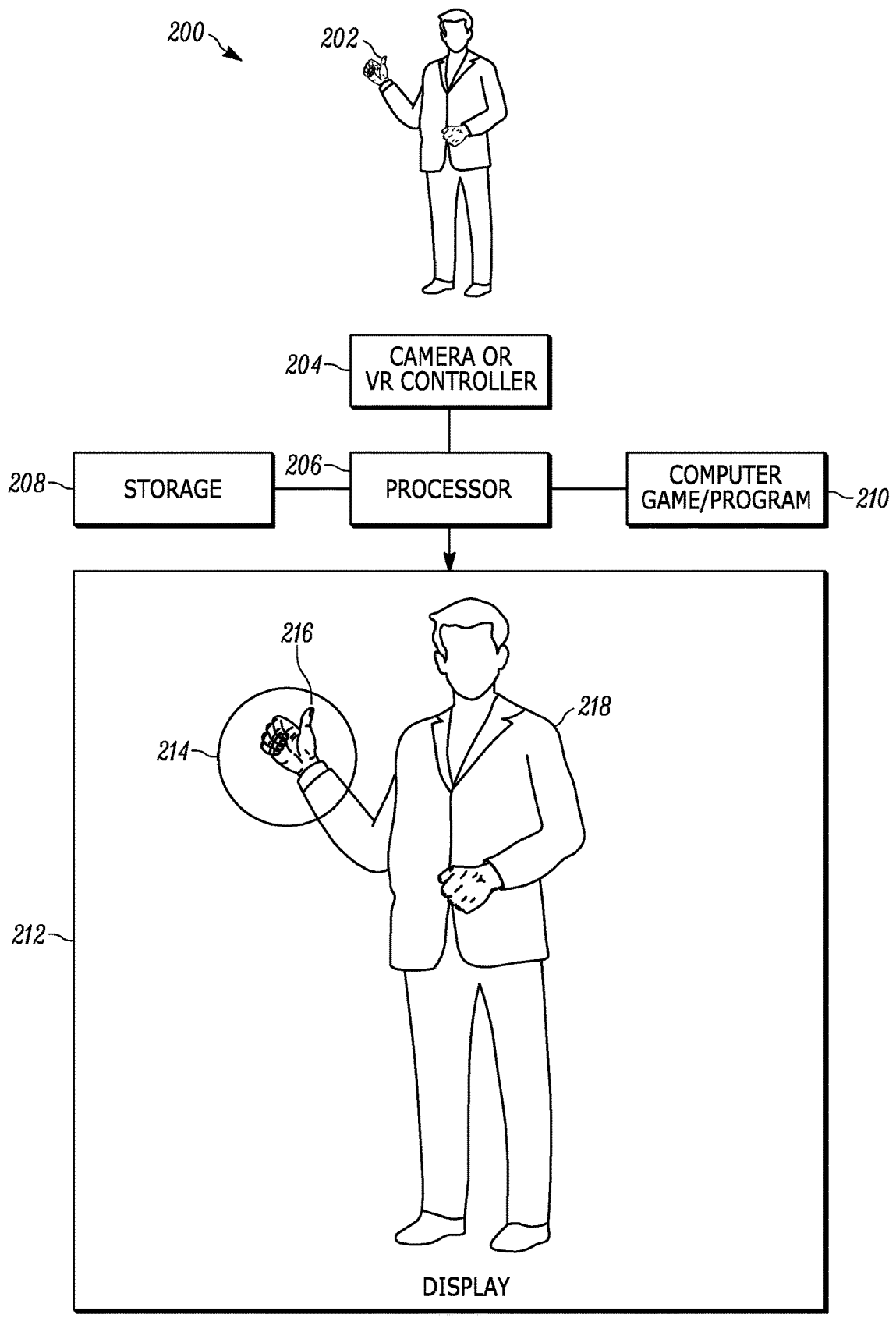
FIG. 2 is a block diagram of an example specific system consistent with present principles.

FIG. 2 shows an example system in which a player 200 may don a virtual reality (VR) headset such as that shown in FIG. 1 or other apparatus for, e.g., playing a computer game. However, it is to be understood that other examples consistent with present principles may pertain to augmented reality (AR) and accordingly that an AR headset and AR 3D objects may be used in those examples.

In any case, FIG. 2 shows that the player 200 may make gestures with one or more appendages 202 such as one or more fingers, hands, arms, legs, feet, or even a tongue or nose. The player 200, including the eyes of the player, and gestures from the appendage 202 may be imaged by one or more cameras or VR controllers 204, which provides input to one or more processors 206 accessing instructions on one or more computer storages 208 to, e.g., execute software-driven computer games or other programs 210. The processor 206 may present demanded images on a display 212, which may be implemented by any of the display devices described herein.

As shown in FIG. 2, the processor 206 may present one or more objects 214 such as one or more three dimensional (3D) objects on the display 212. This may be done, as further explained below, responsive to a trigger signal. The object 214 may be a 3D rendering of a sphere, box, pyramid, or other object and when multiple objects 214 are presented concurrently, each object may be of a unique size, shape, and color and have different functions than the other objects. Also, when multiple objects 214 are presented concurrently, they may appear within the AR/VR environment as though hovering in place until the player 200 moves them around to different locations as described herein.

Note that that the object may be semi-transparent the interior of which (including the below-described gestures) can be observed from all sides. If desired, the object may be kept semi-transparent for the user associated with the object but made opaque to other network peers, thus hiding the gesture inside the object from others. The user may be given the option of whether to make the object totally transparent/ semi-transparent or partially opaque, or the decision as to opacity may be made by, e.g., the game software.

Along with the object 214, an image 216 of the player's appendage 202 is presented to render an emulated appendage that has the same gesture configuration as the player's appendage 202. An image or avatar 218 representing the player 200 may also be presented in the emulated space presented on the display 212.

Figure 3:
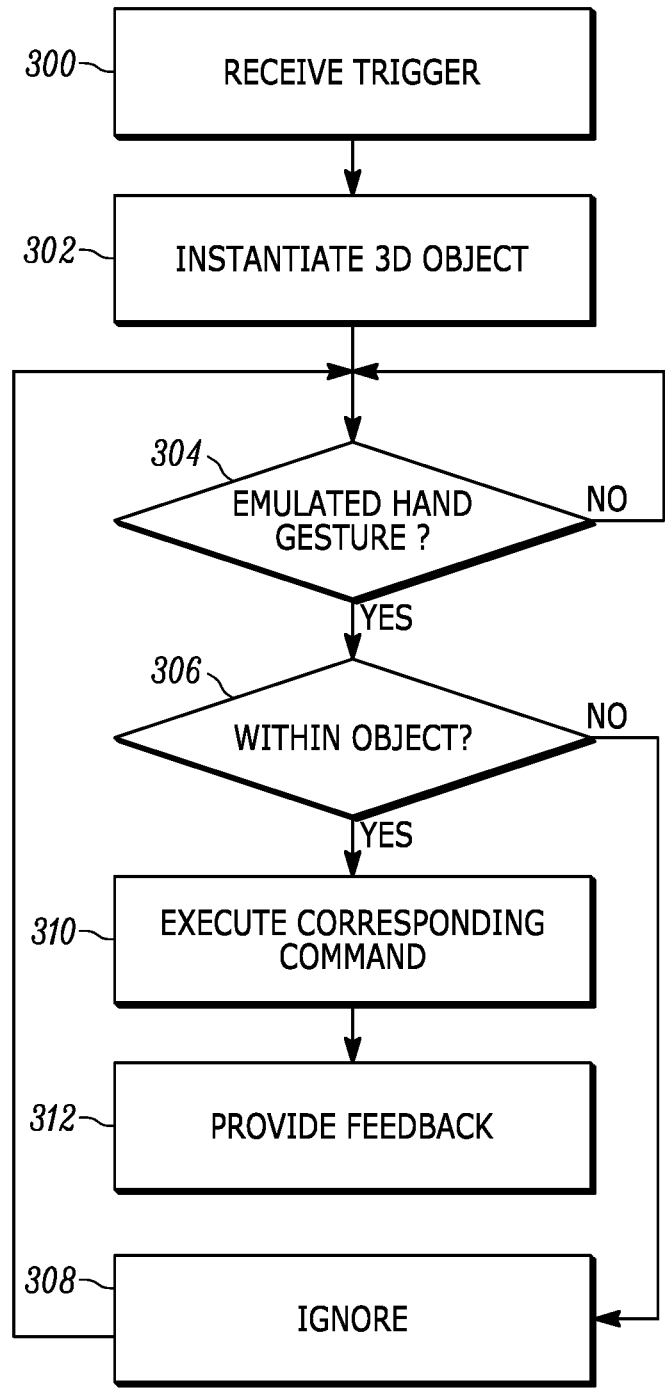
FIG. 3 is a flow chart of example overall logic consistent with present principles.

With the above in mind, attention turns now to FIG. 3 for further understanding. At block 300 a trigger may be received as a precondition for instantiating the object 214 at block 302 for presentation thereof. In example embodiments, the trigger may include detection of a trigger gesture from the player 200, which does not result in a command in contrast to the command gestures divulged below but rather only a trigger to present the object 214 on the display 212. Thus, only one or a limited small number of trigger gestures may be predefined to establish instantiating the object.

An example trigger gesture can be placing two hands together then separating them as detected based on camera input and execution of gesture recognition, alone or in combination with a preceding or subsequent clapping sound generated by a clapping of the user's hands together as may be detected by, e.g., a microphone such as the one described above in reference to FIG. 1. A closing gesture also may be provided to remove the object 214 from display. Example non-limiting closing gestures may be placing the palm(s) down, waving the appendage as if waving away, etc.

Furthermore, note that in addition to or in lieu of using camera input from, e.g., the player's headset to detect a trigger gesture by the player's hand, motion sensors on the player's hand may also be used to track certain movements of the hand using dead reckoning or another position tracking algorithm. The motion sensors may thus include, as examples, accelerometers and gyroscopes. Detecting movement of a video game controller or receiving a particular key sequence to the controller may also be used to identify a trigger gesture.

Furthermore, in addition to or in lieu of a trigger gesture, the trigger to instantiate the object 214 may include an eye tracking signal. For example, if eye tracking as indicated by images from the camera 204 indicates that the player 200 is looking in a particular direction, at a particular portion of the display 212, or at the player's own hand while beginning the trigger gesture with that hand, a trigger to instantiate the object 214 may be established thereby. Both eye tracking and trigger gestures may be used, with both conditions (eyes looking at gesture hand, trigger gesture being made with that hand) being necessary to instantiate the object 214 in some embodiments. Verbal commands may also be used alone or in combination.

In any case, when the object 214 is instantiated at block 302, the logic moves to decision diamond 304 to determine whether a gesture is received. A gesture typically is made by the player 200 moving his appendage 202 and may be imaged for mirroring that gesture using animation of the emulated appendage 216. Note that while FIG. 3 illustrates the logic in flow chart format, state logic or other equivalent logic may be used.

If a gesture is received, the logic moves to decision diamond 306 to determine whether the emulated appendage 216 mirroring the gesture is at least partially within the volume of the object 214. If it is not, the gesture is ignored at block 308.

On the other hand, responsive to the emulated appendage 216 making the gesture being at least partially within the object 214, the logic moves to block 310 to determine whether the gesture correlates to a command, and responsive to the gesture correlating to a command, the command is executed. Visual, audio, or tactile feedback or a combination thereof (on, e.g., a VR headset or video game controller) may be generated at block 312 to indicate that the command is executed.

Thus, the player 200 can view the display 212 and move his appendage 202 until the emulated appendage 216 appears in the object 214. In some embodiments, the object 214 may even become slightly more enlarged in volume and become more luminous once the emulated appendage 216 is placed inside the object 214. The player 200 can then make a gesture with his appendage 202, which he can see mirrored by the emulated appendage 216, to input a command, knowing that gestures made while the emulated appendage 216 is within the object 214 will be processed for command input and that withdrawing the emulated appendage 216 from the object 214 by moving his real appendage 202 will result in any gestures subsequently made not being processed for command input.

Note that determining whether the gesture is a command gesture can be executed by image comparison of the emulated appendage 216 to a set of predefined command gestures, each of which is in turn correlated to a command. Note further that when multiple objects 214 are presented, a gesture within one object may correlate to a first command while the same gesture within a second object may correlate to a different command. In some embodiments, a command may even be established by a sequence of gestures as opposed to a single gesture. Still further, in some embodiments an instantiated object may be accompanied by graphics presented above, below, or to either side of the object to indicate what gestures inside the object may result in commands. The graphics may indicate the gestures themselves in graphical form as well as their resulting commands in text.

Note that when eye tracking is used, eye tracking may be executed using a dedicated device or just be substituted for by a head look-at direction, i.e., instead of eye tracking, the direction in which a player's head is facing may be used.

As for gestures described above, as mentioned a gesture may be a single hand pose, or a continuous gesture such as a continuous directional finger point within the object to direct a continuous scrolling. This is like a controlling an analog stick where you keep pulling the stick to direct. Similarly, to confirm a result of a gesture, a confirmatory gesture such as a player making a continuous pose for a certain amount of time may be required. An example could be to use a thumbs up to confirm and/or a thumbs down to cancel.

Haptic feedback may be used for the menu opening or gesture recognition results. More generally, feedback may be generated when a command is recognized, such as color feedback on a display, audio feedback on a speaker, and haptic feedback.

A predetermined gesture may be correlated to present a hierarchical menu showing new options enabled by the predetermined gesture as newly spawned spheres, or otherwise new gestures may be displayed appertaining to the next level in the hierarchy.

Figure 4:
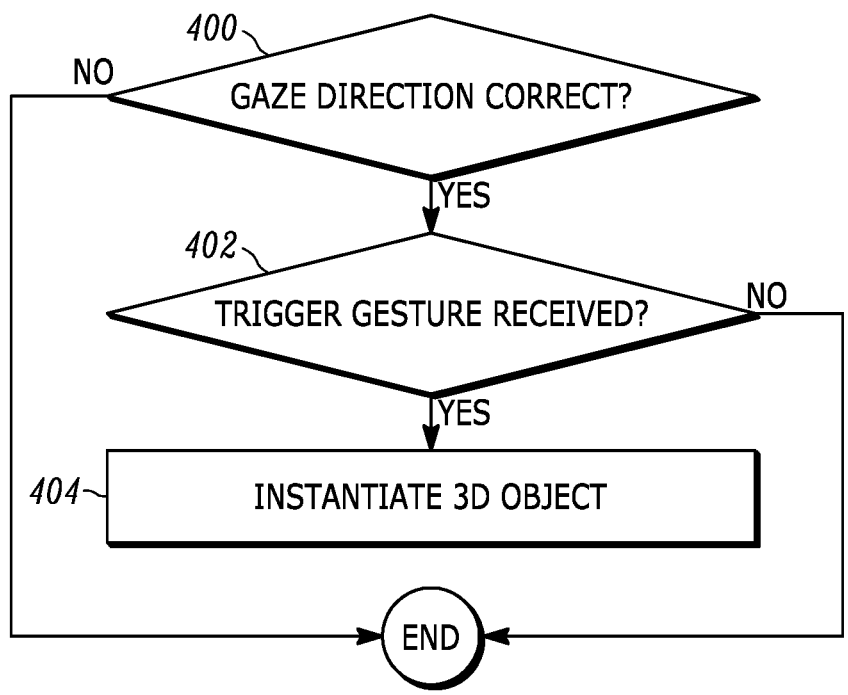
FIG. 4 is a flow chart of example trigger logic consistent with present principles.

FIG. 4 illustrates example trigger logic alluded to above. Decision diamond 400 indicates that eye tracking is used to determine whether the gaze direction of the player 200 is "correct" to establish a trigger, i.e., is in a particular direction, while decision diamond 402 indicates that a trigger gesture must also be received in addition to a correct gaze direction to instantiate the object 214 at block 404. In this example, both a correct gaze direction and a correct trigger gesture must be received simultaneously or within a threshold time period of each other to instantiate the object.

Figure 5:
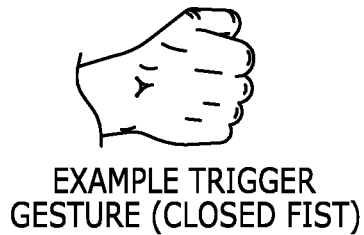
FIGS. 5 and 6 are schematic diagrams of trigger and close gestures to respectively instantiate and remove a 3D object for gesture input.
Figure 6:
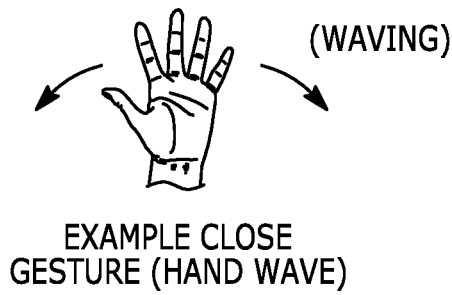

FIGS. 5 and 6 illustrate example trigger gestures to instantiate the object 214 on screen (FIG. 5, closed fist) and to close an instantiated object (FIG. 6, open hand waving).

Another gesture to instantiate the object 214 on screen may be a closed fist opening to a palm-up opened hand. In such a case, once presented the object 214 may continue to be presented as though hovering a particular distance above the user's emulated open-faced hand and may move as the emulated hand moves to continue to hover above the emulated hand. In this way, the object 214 may appear as though it is "staying on" the emulated appendage 216 as moved by the user's actual appendage 202.

As another example to instantiate the object 214, two hands may be brought together with fingers crisscrossing and palms abutting, and then the two hands may be drawn apart to render the instantiated object between emulations of the two hands at a size corresponding to the distance the hands are drawn apart before stopping the gesture. Thus, the greater the distance of the hands, the larger the instantiation of the object.

Figure 7:
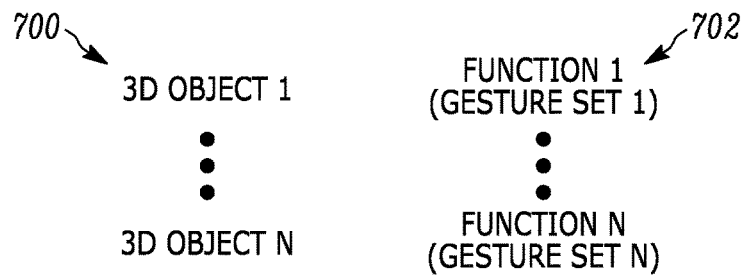
FIGS. 7 and 8 are schematic diagrams of example data structure for correlating gestures to commands.
Figure 8:
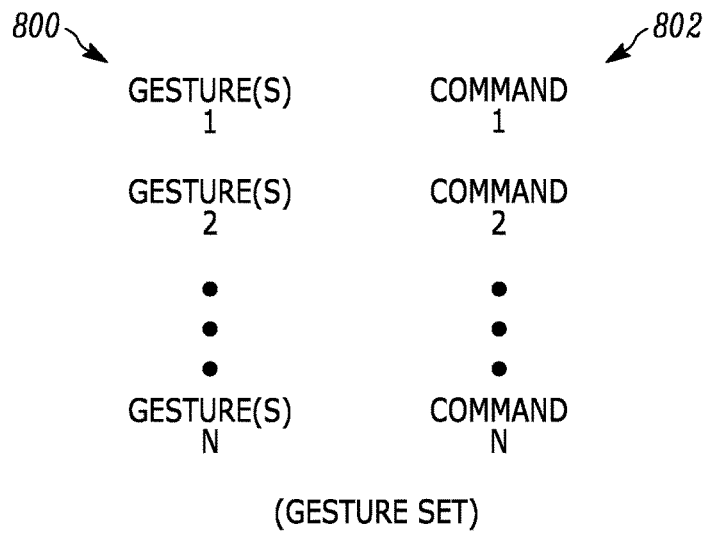

FIGS. 7 and 8 illustrate example data structures for correlating command gestures to input commands. In FIG. 7, for each of plural objects 700, a respective function or gesture set 702 is correlated. Then, a data structure such as that shown in FIG. 8 can be provided for each gesture set in FIG. 7, wherein for each of plural command gestures 800, a respective input command 802 is correlated.

Figure 9:
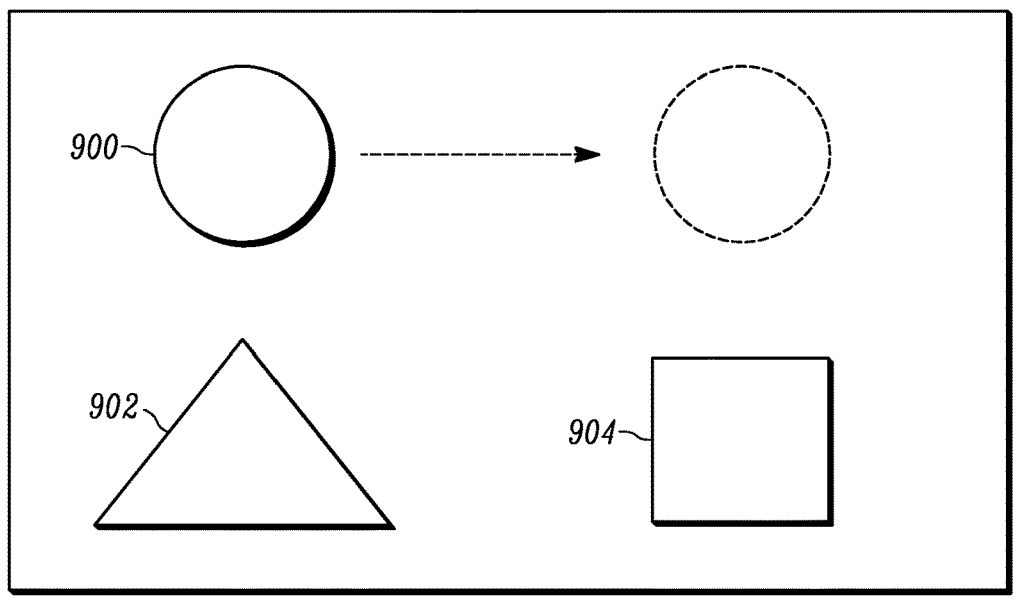
FIG. 9 is a screen shot illustrating plural different gesture-receiving 3D objects and moving one of the objects.

FIG. 9 illustrates an embodiment in which plural gesture objects 900 (sphere), 902 (pyramid), and 904 (box) are presented, if desired with respective functions. Thus, the same gesture if made within the sphere 900 will result in one command but will result in a different command if made within the pyramid 902, with different triggers/trigger gestures instantiating the different objects 900, 902, 904 in the first place. FIG. 9 also indicates that the player 200 can move the gesture objects by, e.g., waving his appendage as if to push the object to a certain location within a VR rendering, or using a drag and drop command on a touch-enabled display, or other method. Similarly, the player can enlarge and shrink objects if desired by respective gestures such as moving his hands away from each other to enlarge an object and moving the hands toward each other to shrink the object. The player can even choose a color in which an object is to be presented via a verbal command or other input.

Figure 10:
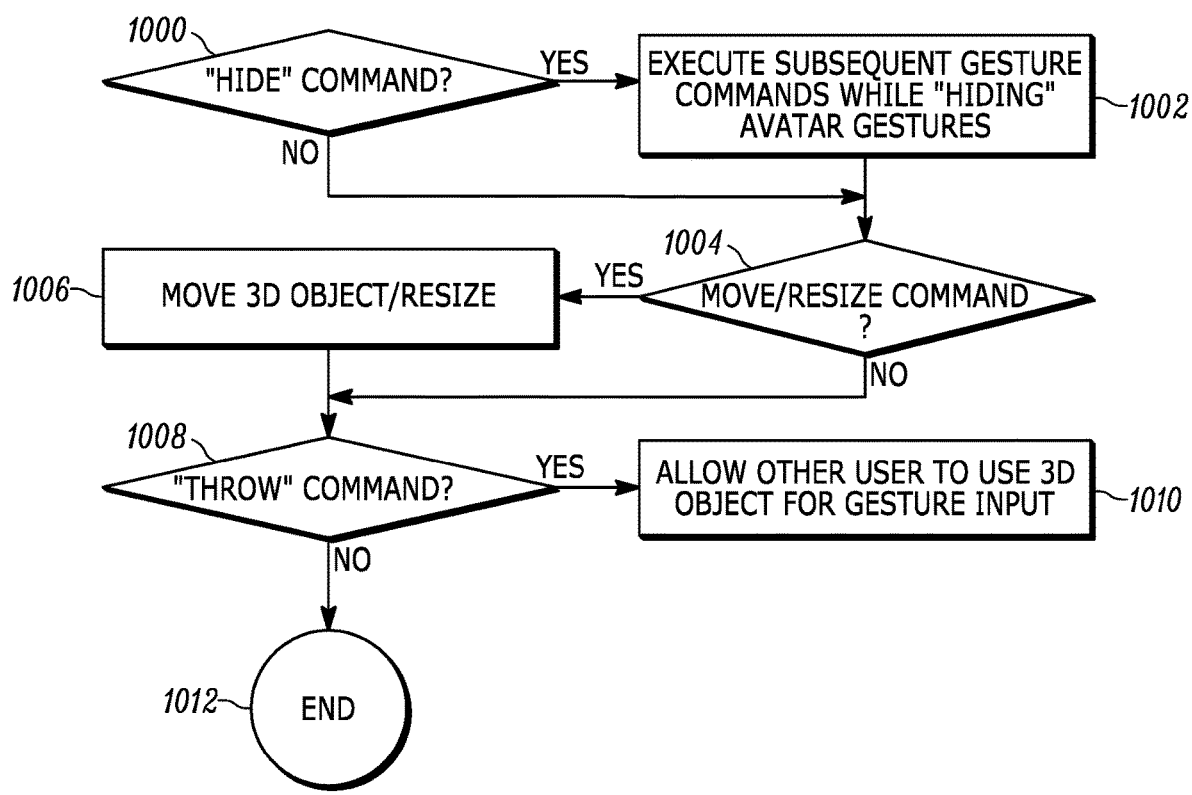
FIG. 10 is a flow chart of example ancillary logic consistent with present principles.

FIG. 10 illustrates additional optional logic that may be implemented consistent with present principles. Commencing at decision diamond 1000, it is determined whether a hide command has been received. A hide command, such as one hand moving up and down in front of the other hand making a command gesture on a side of the other hand opposite the player's body, enables the player 200 to input a command without other AR/VR players knowing what the player 200 is doing via their own respective headsets. This may be done even if the emulated appendage as to be seen by the player himself is still presented via the player's own headset to mimic the player's actual hand movements. Also note that initial trigger gestures themselves may also be hidden once the player's headset or other device identifies that one has begun to be made, e.g., in conjunction with a hide command.

In any case, if a hide command is received, the logic moves to block 1002 to execute the command indicated by the command gesture while not mirroring the gesture using the emulated appendage 216 of FIG. 2 on the display screens of the other users' headsets that are also participating in the same AR/VR experience. The instantiated object itself may not be presented on the other users' headset display screens, either, even if still presented on the display screen of the player's headset. Instead, the image of the avatar 218 as appearing on the other users' display screens may be animated to do certain things within the context of the game or to make natural movements to blend in so the other users do not know what the player is doing. The avatar may even be animated to look like it is moving continuously as it was before the gesture command is received.

Moving on to decision diamond 1004, if a move or resize gesture command is received according to discussion above, the logic proceeds to block 1006 to move and/or resize the object 214 shown in FIG. 2 or any of the objects shown in FIG. 9. Yet again, decision diamond 1008 indicates that a first player can create or instantiate an object 214 and then "throw" the object to another player to allow the other player to use the object for gesture input at block 1010. For example, once a player has instantiated an object, he can make a throwing gesture toward another player, and the other player in the direction of the "throw" can then be presented, on her display, with the image of the thrown object for use in inputting gesture commands as discussed above. The logic ends at state 1012.

Figure 11:
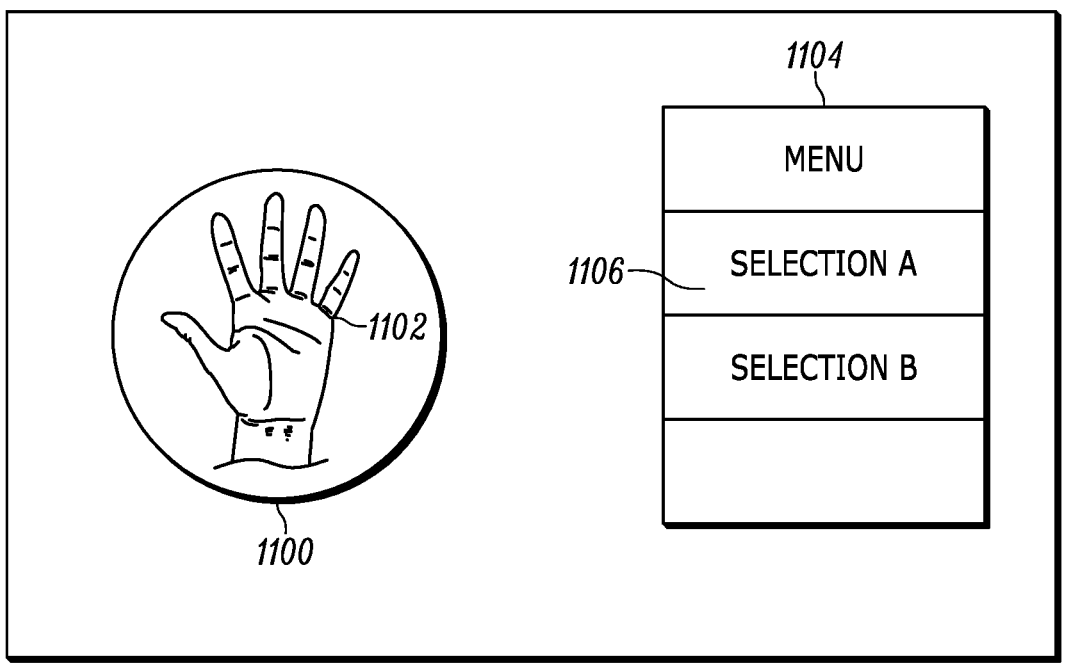
FIG. 11 is a screen shot illustrating use of a gesture within a 3D object to open a menu with selectable options.

FIG. 11 illustrates that an object 1100 for receiving gestures from an emulated appendage 1102 can be used to correlate the gesture of emulated appendage 1102 (in this case, an open hand) to a particular command. In the example shown, the command is "present a menu", which is presented as indicated at 1106 for interaction with, e.g., the other (non-gesturing) hand of the player to select one of the selectable options in the menu. Other example commands that can be correlated to respective gestures include, but are not limited to, start game play, skip a scene, replay a scene, scroll in a direction and speed of the gesture, provide more ammunition, activate a game weapon associated with object 1100, etc. Verbal input may also be used to verify or input commands.

Furthermore, note that in some embodiments, rather than presenting the object 1100 itself for the player to then provide a command using the object 1100 to present the menu, a trigger gesture may be used to present the menu itself responsive to the trigger gesture. In this example, the menu itself may establish the 3D object that is presented based on detection of the trigger gesture.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer memory that is not a transitory signal and that comprises instructions executable by at least one processor to:
present a three-dimensional (3D) object on at least one display;
image a player's appendage to render an emulated appendage, the emulated appendage having a gesture configuration as established by the player's appendage, the emulated appendage being different from the 3D object;
responsive to the emulated appendage being at least partially within the 3D object, and responsive to the gesture configuration correlating to a command, execute the command; and
responsive to the emulated appendage not being at least partially within the 3D object, not determine whether the gesture configuration correlates to a command.

2. The device of claim 1, comprising the at least one processor and the at least one display.

3. The device of claim 1, wherein the instructions are executable to:
present the 3D object responsive to reception of at least one trigger.

4. The device of claim 3, wherein the at least one trigger comprises at least one eye tracking input signal.

5. The device of claim 3, wherein the at least one trigger comprises at least one gesture of the appendage.

6. The device of claim 5, wherein the at least one trigger comprises at least one eye tracking input signal.

7. The device of claim 1, wherein the command comprises a command to present at least one menu with at least one selection.

8. The device of claim 3, wherein the trigger is input by a first player and the emulated appendage is an emulated appendage of a second player.

9. The device of claim 1, wherein the instructions are executable to:
conceal the gesture configuration of the emulated appendage.

10. An assembly, comprising:
at least one display;
at least one processor configured to control the at least one display to present images thereon, the at least one processor being configured with instructions to:
responsive to receiving a first eye tracking signal, present a three-dimensional (3D) object on the at least one display;
receive at least one image of a player's appendage;
based at least in part on the at least one image, render an emulated appendage, the emulated appendage having a gesture configuration as established by the player's appendage;

responsive to the emulated appendage being at least partially within the 3D object, determine whether the gesture configuration correlates to a command, and responsive to the gesture configuration correlating to a command, execute the command; and responsive to the emulated appendage not being at least partially within the 3D object, not determine whether the gesture configuration correlates to a command.

11. The assembly of claim 10, wherein the instructions are executable to:

present the 3D object responsive to reception of at least one trigger.

12. The assembly of claim 11, wherein the at least one trigger comprises at least one gesture of the appendage.

13. The assembly of claim 10, wherein the command comprises a command to present at least one menu with at least one selection.

14. The assembly of claim 11, wherein the trigger is input by a first player and the emulated appendage is an emulated appendage of a second player.

15. The assembly of claim 10, wherein the instructions are executable to:

conceal the gesture configuration of the emulated appendage.

16. A method, comprising:

opening a 3D object for presentation on a display in response to a trigger;

emulating a player's hand in emulated space to render an emulated hand configured to have a same gesture as the player's hand as imaged by a camera; and only when the emulated hand is within the 3D object in emulated space, correlating gestures of the emulated hand to input commands, and otherwise not considering hand gestures for correlation to commands.

17. The method of claim 16, wherein the trigger comprises a gaze direction detected by eye tracking.

18. The method of claim 16, wherein the trigger comprises a trigger hand gesture.

19. The method of claim 16, wherein at least one of the commands comprises a command to present at least one menu with at least one selection.

20. The method of claim 16, wherein the trigger is input by a first player and the emulated hand is an emulated hand of a second player.

* * * * *